US011378217B2

(12) United States Patent
Lueghamer et al.

(10) Patent No.: US 11,378,217 B2
(45) Date of Patent: Jul. 5, 2022

(54) FLOATABLE PIPE COMBINATION

(71) Applicant: agru Kunststofftechnik Gesellschaft m.b.H., Bad Hall (AT)

(72) Inventors: Albert Lueghamer, Sierning (AT); Wolfgang Prangl, Steyr (AT)

(73) Assignee: agru Kunststofftechnik Gesellschaft m.b.H., Bad Hall (AT)

( * ) Notice: Subject to any disclaimer, the term of this patent is extended or adjusted under 35 U.S.C. 154(b) by 380 days.

(21) Appl. No.: 16/631,973

(22) PCT Filed: Jul. 20, 2018

(86) PCT No.: PCT/AT2018/060156
§ 371 (c)(1),
(2) Date: Jan. 17, 2020

(87) PCT Pub. No.: WO2019/018869
PCT Pub. Date: Jan. 31, 2019

(65) Prior Publication Data
US 2020/0166170 A1    May 28, 2020

(30) Foreign Application Priority Data

Jul. 27, 2017    (DE) .................... 10 2017 117 045.6

(51) Int. Cl.
| F16L 55/10 | (2006.01) |
| F16L 55/115 | (2006.01) |
| F16L 1/12 | (2006.01) |
| F16L 23/00 | (2006.01) |

(52) U.S. Cl.
CPC ............. *F16L 55/115* (2013.01); *F16L 1/126* (2013.01); *F16L 23/006* (2013.01)

(58) Field of Classification Search
CPC ......... F16L 55/115; F16L 1/126; F16L 23/006
USPC ............................................. 138/93, 109, 89
See application file for complete search history.

(56) References Cited

U.S. PATENT DOCUMENTS

| 1,389,542 A | * | 8/1921 | Wereley ................ F22B 37/221 |
| | | | 220/327 |
| 1,934,681 A | | 11/1933 | Damsel |
| 3,204,658 A | | 9/1965 | Suzuki |
| 3,357,193 A | * | 12/1967 | Fitzgibbon, Jr. .......... F42D 1/18 |
| | | | 156/212 |

(Continued)

FOREIGN PATENT DOCUMENTS

| NL | 7908058 A | 6/1981 |
| WO | 00/78603 A1 | 12/2000 |
| WO | 2016/153840 A1 | 9/2016 |

OTHER PUBLICATIONS

International Search Report in PCT/AT2018/060156, dated Nov. 27, 2018.

*Primary Examiner* — James F Hook
(74) *Attorney, Agent, or Firm* — Collard & Roe, P.C.

(57) ABSTRACT

A floatable pipe combination has a plastic pipe having a rear longitudinal end, on which a rear flange region is formed, and a front longitudinal end, on which a front flange region is formed, a closing cover arranged on the rear longitudinal end, and a closing cover arranged on the front longitudinal end. A pulling device is arranged on the closing cover. At least on the front longitudinal end, a flange protection with an outer protective covering is arranged. The outer protective covering is formed to radially project with respect to the outer diameter of the plastic pipe.

17 Claims, 4 Drawing Sheets

(56) References Cited

U.S. PATENT DOCUMENTS

| | | | | | |
|---|---|---|---|---|---|
| 3,576,108 | A | * | 4/1971 | Rowland | E02B 15/0828 405/72 |
| 3,685,297 | A | * | 8/1972 | Juodis | E02B 15/085 405/72 |
| 3,870,085 | A | * | 3/1975 | Schneider | E03F 7/02 138/93 |
| 4,349,047 | A | * | 9/1982 | Ditto | F16L 55/134 166/187 |
| 4,514,447 | A | * | 4/1985 | Boxmeyer | E04H 12/18 428/109 |
| 4,568,109 | A | * | 2/1986 | Prueter | F16L 23/08 285/55 |
| 4,838,075 | A | * | 6/1989 | Friedrich | F16L 55/115 138/90 |
| 5,867,547 | A | * | 2/1999 | Lee | G21C 17/00 376/249 |
| 6,059,136 | A | * | 5/2000 | Lin | B65D 45/32 220/212.5 |
| 6,135,156 | A | | 10/2000 | Donoho et al. | |
| 6,321,793 | B1 | * | 11/2001 | Czaplicki | B29C 44/18 138/172 |
| 2018/0104149 | A1 | | 4/2018 | Nowak | |

\* cited by examiner

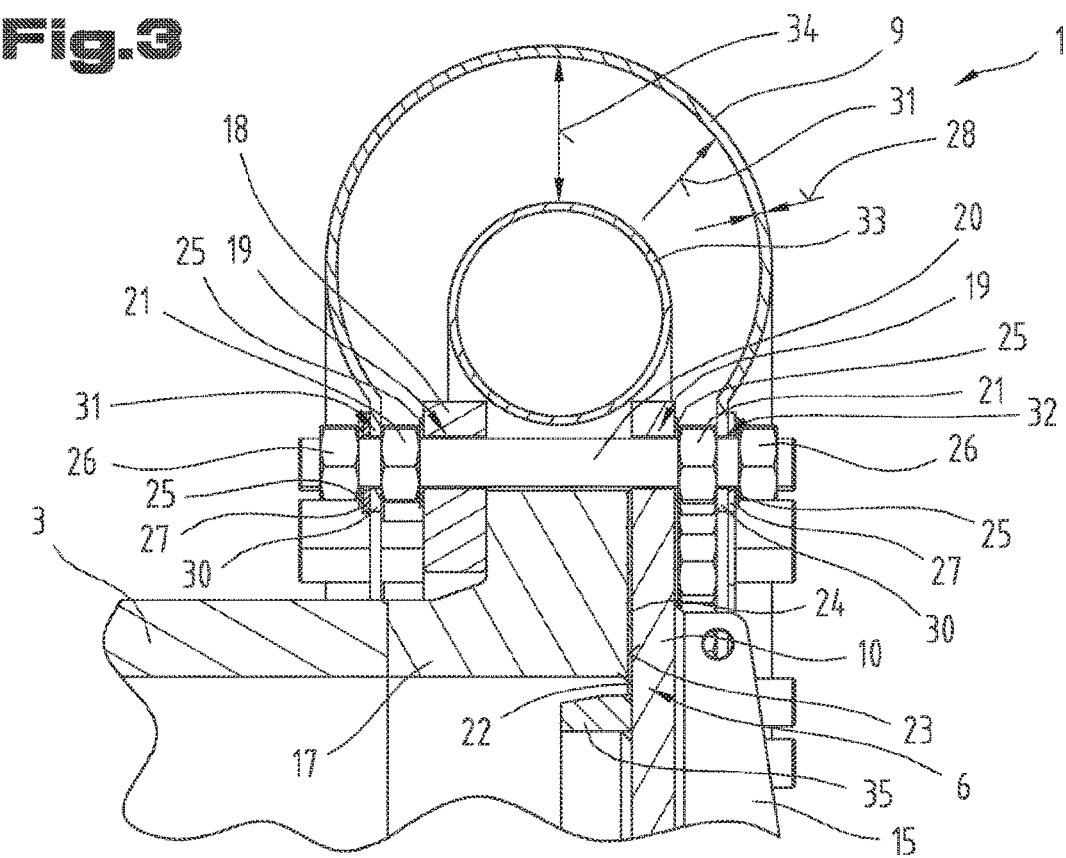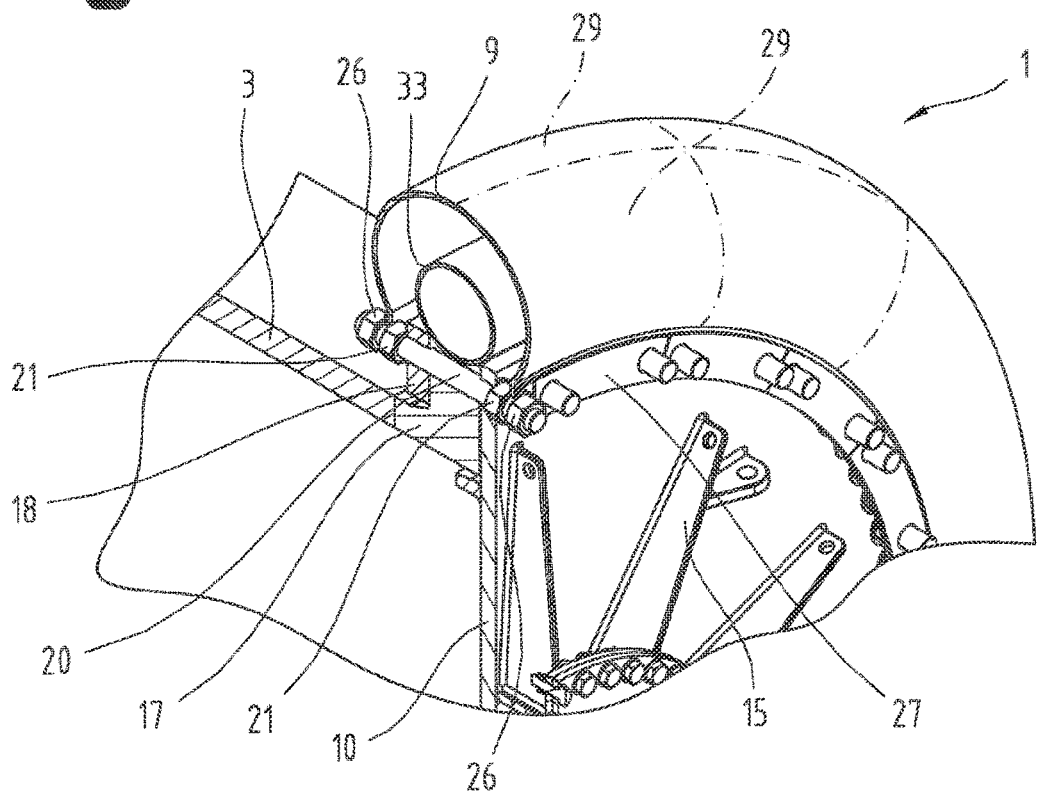

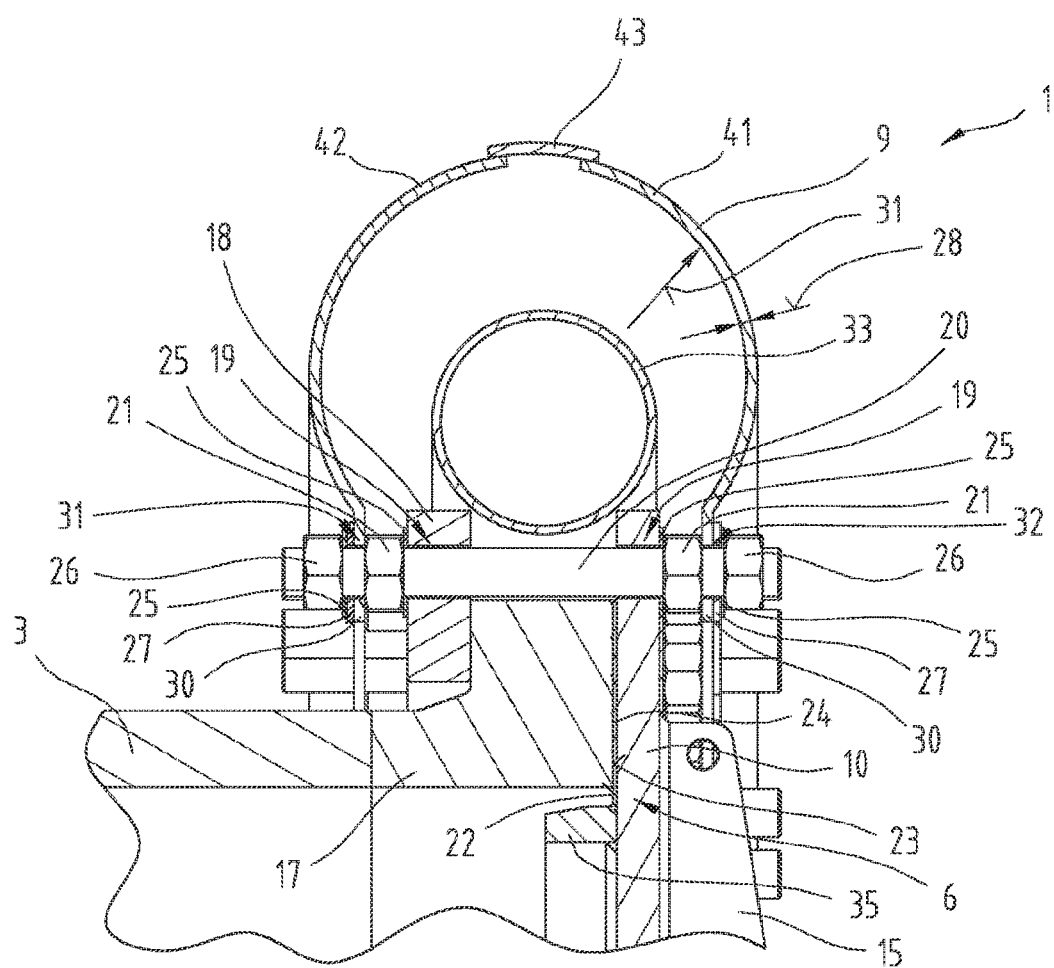

FLOATABLE PIPE COMBINATION

CROSS REFERENCE TO RELATED APPLICATIONS

This application is the National Stage of PCT/AT2018/060156 filed on Jul. 20, 2018, which claims priority under 35 U.S.C. § 119 of German Application No. 10 2017 117 045.6 filed on Jul. 27, 2017, the disclosure of which is incorporated by reference. The international application under PCT article 21(2) was not published in English.

BACKGROUND OF THE INVENTION

Field of the Invention

The invention relates to a floatable pipe combination.

Description of the Related Art

Plastic pipes with a large diameter, which are installed in waters, are needed in diverse fields of application. In this regard, the plastic pipes are guided into the water immediately after extruding. Hence, it is possible to produce plastic pipes having a length of more than 5 m, in particular having a length of more than 1,000 m, in a strand. The plastic pipes are provided with closing covers at their longitudinal ends after production and are thereby turned into floatable pipe combinations. Several ones of such pipe combinations can be coupled to a ship by means of ropes and by pulled across large distances on the water by means of the ship.

In this regard, the individual pipe combinations can collide and damage one another while being pulled by the ship. In particular in flange regions on longitudinal ends of the pipe combinations, such damage is undesired since it can have a negative impact on the tightness of several connected plastic pipes.

SUMMARY OF THE INVENTION

It was the object of the present invention to overcome the shortcomings of the prior art and to provide a floatable pipe combination and a method for producing such a pipe combination, by means of which the plastic pipes remain protected from damage during transport.

This object is achieved by means of a device and a method according to the claims.

According to the invention, a floatable pipe combination is provided, which comprises the following components:
- a plastic pipe having a rear longitudinal end, on which a rear flange region is formed, and a front longitudinal end, on which a front flange region is formed;
- a closing cover arranged on the rear longitudinal end;
- a closing cover arranged on the front longitudinal end, said closing cover comprising a pulling device.

At least on the front longitudinal end, a flange protection with an outer protective covering is arranged, wherein the outer protective covering is formed to radially project with respect to the outer diameter of the plastic pipe.

The floatable pipe combination according to the invention has the advantage that by the flange protection, the flange regions of the plastic pipe are protected from damage during transport in waters. It is thus possible that several plastic pipes and/or floatable pipe combination are arranged next to one another and pulled in water by means of a ship. By the protection of the flange regions, possible damage and thus required repairs when connecting individual pipes can be impeded.

It can further be useful if the front flange region and/or the rear flange region comprises a lapped flange, which is supported on a stub end, and the outer protective covering of the flange protection is screwed together with the lapped flange. The advantage of this is that by this measure the outer protective covering of the flange protection is fixedly connected to the flange region to be protected and, thus, counteracting energy can be damped and/or absorbed by means of the outer protective covering.

It can further be provided for that the outer protective covering is formed in its base shape as a rotational body, in particular as a torus, which is open on its side facing the center of rotation and accommodates the flange area. The advantage of this is that by this measure the outer protective covering can surround the flange area in the form of an envelope and thus provide good protection against external influences.

In addition to this, it can be provided for that the outer protective covering spans the closing cover, the stub end and the lapped flange in a semicircle. The advantage of this is that by this measure the complete flange region of the plastic pipe is spanned by the outer protective covering and thus all essential components of the flange region are protected.

In an alternative embodiment, it can be provided for that the outer protective covering comprises a first covering part and a second covering part, wherein the first covering part is arranged in the region of the lapped flange and the second covering part is arranged in the region of the closing cover. In this regard, the two covering parts can simply be mounted to the plastic pipe. Moreover, by using individual covering parts material can be saved, whereby the outer protective covering has a low weight and can be produced inexpensively. In a further embodiment, it can be provided for that the two covering parts are welded together by braces. Thereby, the two covering parts can be provided with sufficient stability to cushion mechanical effects on the two covering parts.

According to a further embodiment, it is possible that the outer protective covering is coupled to the flange region by means of a fastening means, in particular a threaded rod, wherein in the lapped flange and in the closing cover through-bores are formed which are penetrated by the threaded rod and wherein on the threaded rod inner clamping nuts are arranged by means of which the closing cover and the lapped flange are clamped to each other and wherein the outer protective covering is clamped between outer clamping nuts and the inner clamping nuts. The advantage of this is that by this measure the outer protective covering can easily be arranged on the plastic pipe and, moreover, comprises a sufficiently stable connected to the plastic pipe.

It can further be useful if clamping rings or clamping ring segments are arranged between the outer clamping nuts and the outer protective covering. The advantage of this is that by the clamping rings or clamping ring segments the force acting from the outer clamping nuts on the outer protective covering can be distributed evenly, thus avoiding local overstraining of the outer protective covering.

Moreover, it can be provided for that the outer protective covering is formed from a plastic material, in particular a thermoplastic material. The advantage of this is that such a plastic material has a high elasticity and is thus particularly suitable for absorbing impact energy.

In particular, it can be provided for that the outer protective covering is formed from polyethylene. This plastic material is easy to process and has a sufficiently high solidity.

It can further be provided for that the outer protective covering comprises individual protective covering segments, which are welded together to form the outer protective covering. The advantage of this is that the individual protective covering segments can be produced easily and can be connected to one another to form the outer protective covering by welding, wherein the outer protective covering can have very large dimensions, for example an outer diameter of 4.5 meters and more.

In a first exemplary embodiment, it can be provided for that the individual protective covering segments are produced by means of deep drawing.

In a further exemplary embodiment, it can be provided for that the individual protective covering segments are produced by means of injection molding.

According to a particular embodiment, it is possible that the flange protection comprises an internal protective body, in particular a rubber hose, which encloses the circumference of the flange region. The advantage of this is that the internal protective body can serve for the application of additional stability in the flange protection. Particularly a rubber hose has a good deformability and can thus be used as internal protective body. In particular, it can be provided for that the internal protective body is arranged within the outer protective covering and does not contact the outer protective covering. In case of deformation of the outer protective covering, it can lie against the internal protective body and is hence supported by the internal protective body.

According to an advantageous further embodiment, it can be provided for that a centering ring is arranged on an inner end face of the closing cover arranged on the front longitudinal end. The advantage of this is that by this measure, the closing cover can relatively easily be positioned with respect to the plastic pipe.

In particular, it can be advantageous if a pulling shackle is coupled to the closing cover arranged at the front longitudinal end, wherein a pivot bearing is formed between the pulling shackle and the closing cover such that the pulling shackle is arranged on the closing cover so as to be rotatable relative to the closing cover. The advantage of this is that by this measure, the pull rope, which is arranged between the ship and the floating pipe combination, is not subjected to torsion. This can serve to prevent that the pull rope is damaged and/or cut off due to the torsion of the floating pipe combination. This is particularly necessary since the floating pipe combination constantly rotates about its own longitudinal central axis during transport on the water. The rotating movement is caused by the fact that the cooling effect of the water causes less thermal expansion on the underside of the pipe than on the upper side of the pipe, which is illuminated by the sun, and the pipe bends and thus rotates due to the different thermal expansion.

It can further be provided for that stiffening ribs are arranged on the outer protective covering on its radially outer side and/or on its radially inner side. The advantage of this is that by this measure the outer protective covering can be stiffened and can thus have a smaller wall thickness to achieve like values of solidity and/or of dampening as compared to an outer protective covering without stiffening ribs and with a larger wall thickness.

Moreover, it can be provided for that the outer protective covering has a wall thickness of between 5 mm and 25 mm, in particular between 7 mm and 20 mm. The advantage of this is that an outer protective covering with such a wall thickness can have a sufficient stability and still have a mass as low as possible.

According to the invention, a method for producing a floatable pipe combination is provided for, said method comprising the following method steps:

providing a plastic pipe having a rear longitudinal end, on which a rear flange region is formed, and a front longitudinal end, on which a front flange region is formed;

mounting a closing cover to the rear longitudinal end of the plastic pipe;

mounting a closing cover to the front longitudinal end of the plastic pipe;

mounting an outer protective covering of a flange protection to the front longitudinal end of the plastic pipe.

An embodiment according to which it can be provided for that the closing cover is mounted to the front longitudinal end of the plastic pipe by means of threaded rods and inner clamping nuts and that subsequently in the course of the method individual protective covering segments are mounted to the threaded rods by means of outer clamping nuts and that the individual protective covering segments are welded together to form the outer protective covering is also advantageous. By this measure, the outer protective covering can be produced easily and cost-effectively and, moreover, can be easily and quickly be mounted to the pipe to be protected.

The terms rear longitudinal end and front longitudinal end of the plastic pipe refer to the pulling direction and/or transport direction during the transport of the pipe combination. As the plastic pipe is preferably formed equally on both longitudinal ends, the rear longitudinal end and the front longitudinal end are defined by the longitudinal end on which the closing cover is arranged. In a particular embodiment, closing covers, which are suitable for pulling the pipe combination, can be arranged on both longitudinal ends.

BRIEF DESCRIPTION OF THE DRAWINGS

For the purpose of better understanding of the invention, it will be elucidated in more detail by means of the figures below.

These show in a respectively very simplified schematic representation:

FIG. 3 a sectional top view of the first exemplary embodiment of the flange connection with flange protection;

FIG. 4 a sectional view in isometric view of the flange connection with flange protection;

FIG. 7 a sectional top view of a third exemplary embodiment of the flange connection with flange protection.

DETAILED DESCRIPTION OF THE PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
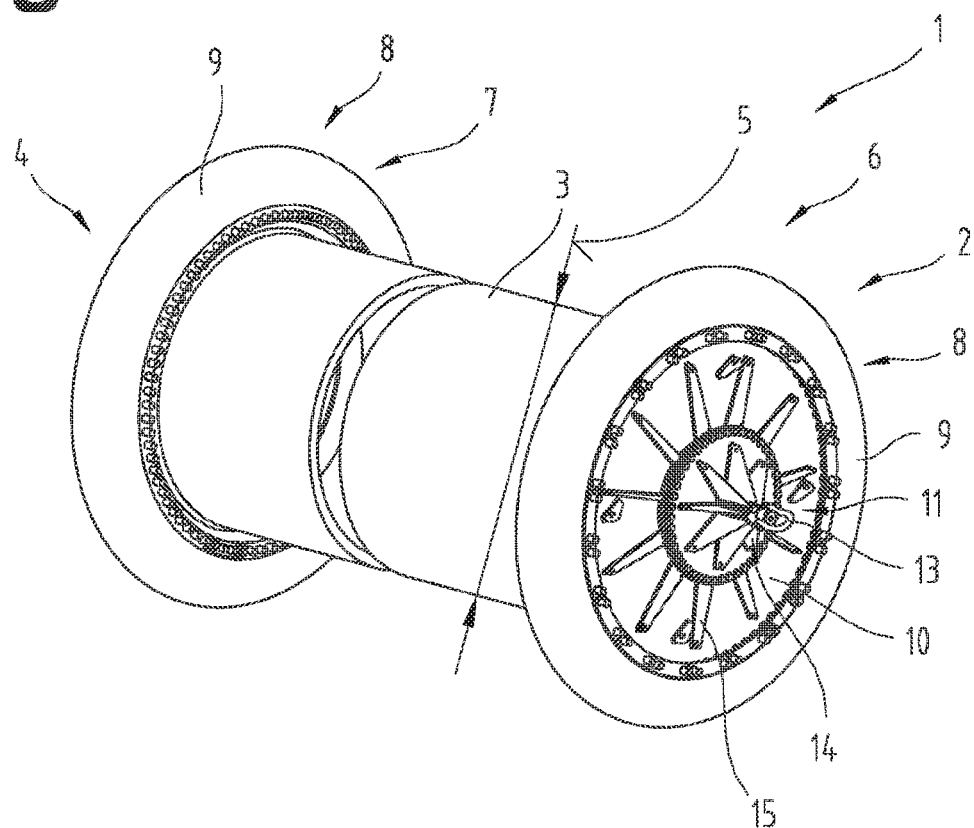
FIG. 1 a perspective view of a first exemplary embodiment of a floatable pipe combination.
Figure 2:
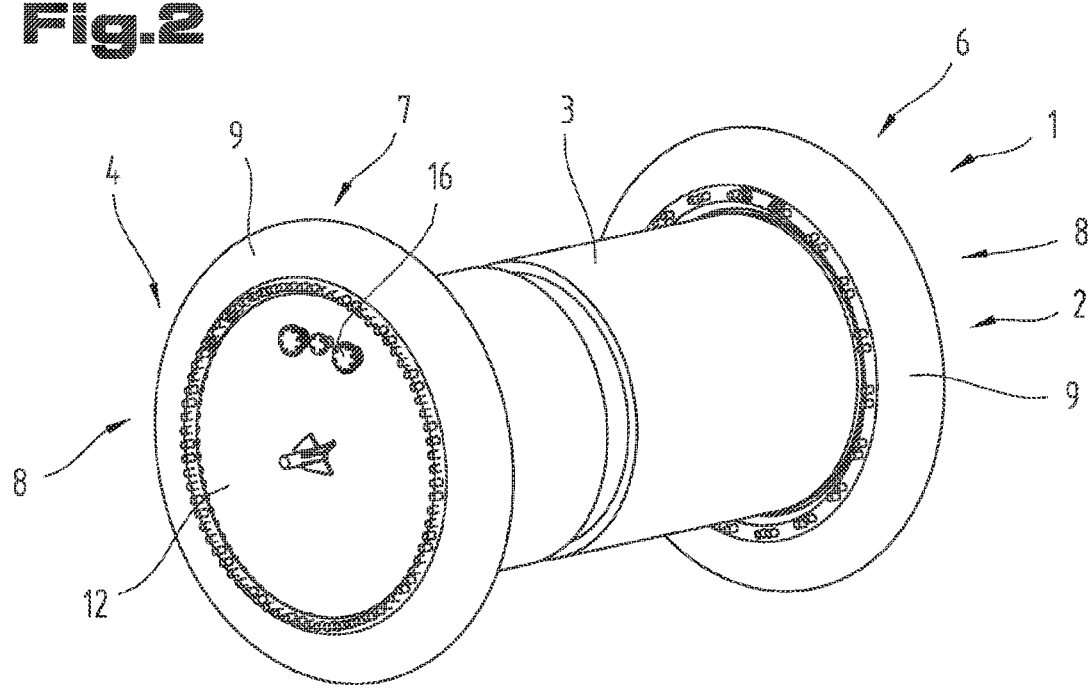
FIG. 2 a further perspective view of the first exemplary embodiment of the floatable pipe combination.

FIGS. 1 and 2 show a first exemplary embodiment of a floatable pipe combination 1 in two different views, wherein FIG. 1 shows a front longitudinal end 2 of a plastic pipe 3 in the foreground and FIG. 2 shows a rear longitudinal end 4 of the plastic pipe 3 in the foreground. In this respect, the plastic pipe 3 is shown in a shortened form and thus cut in the middle.

The plastic pipe 3 can for example have an outer diameter 5 of between 100 mm and 5,000 mm, in particular between 400 mm and 4,000 mm. The structure according to the invention of the pipe combination 1 has proved particularly advantageous for plastic pipes 3 with a large diameter.

The plastic pipes 3 are preferably laid directly in waters, for example in a sea. In this regard, it can in particular be provided for that the plastic pipes 3 serve for the transport of large amounts of sea water, for example for cooling power stations and/or tanks. Due to the structure of the floatable pipe combination 1, the plastic pipes 3 can be transported over long distances directly at the open sea and/or on a water by means of a towing vessel.

The plastic pipes 3 can have a large longitudinal extent of several hundreds of meters up to a length of approximately 1,000 meters.

In particular, it is provided for that the plastic pipes 3 have a front flange region 6 and a rear flange region 7, on which several ones of the plastic pipes 3 are screwed together to form a continuous pipe connection in the application area. In order to protect this flange region 6, 7 during transport of several floating pipe combinations 1, a flange protection 8 is provided. The flange protection 8 has an outer protective covering 9 surrounding the flange region 6, 7 and thus protecting it from damage by the adjacent pipe.

The floatable pipe combination 1 further comprises a closing cover 10 which has a pulling device 11 and is arranged on the front longitudinal end 2 of the plastic pipe 3. In this regard, the pulling device 11 serves for being able to connect the pipe combination 1 to a ship intended for pulling the pipe combination 1 by means of pull rope.

Furthermore, a rear closing cover 12 serving for closing the rear longitudinal end 4 of the plastic pipe 3 is formed. The two closing covers 10, 12 can also be referred to as blind flange, and serve for being able to water-tightly close off the inside of the plastic pipe 3. This allows for a cavity filled with air to be provided at the inside of the plastic pipe 3, whereby the pipe combination 1 becomes floatable.

The front closing cover 10 and the rear closing cover 12 can, as can be seen from FIGS. 1 and 2, have different structures. In an alternative, not depicted embodiment variant of the pipe combination 1, it can also be provided for that the front closing cover 10 and the rear closing cover 12 have like structures.

As can be seen particularly well from FIG. 1, the pulling device 11 of the front closing cover 10 has a pulling shackle 13 serving for connecting a pull rope to the closing cover 10. The pulling shackle 13 is preferably coupled to the front closing cover 10 by means of a pivot bearing 14.

It can further be provided for that the front closing cover 10 has stiffening ribs 15, which serve for stiffening the closing cover 10, to be able to absorb tensile forces. This can particularly be necessary since the pulling shackle 13 is arranged at the center of the front closing cover 10 and the force is introduced into the plastic pipe 3 at its outer diameter.

As can be seen from FIG. 2, it can be provided for that access openings 16, which can for example be used for a pressure test and/or a tightness test of the floatable pipe combination 1, are arranged in the rear closing cover 12. The access openings 16 are closed by a blind flange in the floatable state of the pipe combination 1.

FIGS. 3 and 4 show a longitudinal section of the plastic pipe 3 in the region of the front longitudinal end 2, wherein a normal view onto the intersection was selected in FIG. 3 and the intersection is represented in a perspective view in FIG. 4.

As can be seen from FIGS. 3 and 4, it can be provided for that a stub end 17, which serves for holding a lapped flange 18, is arranged on the plastic pipe 3. In this regard, the stub end 17 is welded together with the end face of the plastic pipe 3. The formation of the stub end 17 and/or lapped flange 18 is to allow for connecting several ones of the plastic pipes 3 to one another by means of a screw connection. For this purpose, through-bores 19, which serve for holding the screw connection, are arranged in the lapped flange 18.

As can particularly well be seen from FIGS. 3 and 4, it is provided for that the pipe combination 1 comprises the flange protection 8, in particular the protective covering 9, serving for protection of the flange region 6.

The closing cover 10 can also comprise through-bores 19 having the same hole pattern as the through-bores 19 in the lapped flange 18.

In particular, it can be provided for that the closing cover 10 is screwed together with the lapped flange 18 by means of a threaded rod 20 and by means of inner clamping nuts 21. In this regard, for sealing the plastic pipe 3, it can be provided for that a seal 24 is arranged between an inner end face 22 of the closing cover 10 and an end face 23 of the stub end 17. It can further be provided for that a washer or circlip 25 is arranged between the inner clamping nut 21 and the lapped flange 18 and/or between the inner clamping nut 21 and the closing cover 10.

It can further be provided for that the outer protective covering 9 is clamped relative to the inner clamping nut 21 by means of an outer clamping nut 26 in each case. In this regard, the outer protective covering 9 can span the lapped flange 18, the stub end 17 and the closing cover 10. Moreover, clamping rings or clamping ring segments 27 can be provided, which are arranged between the outer clamping nut 26 and the outer protective covering 9 and serve for even application of forces into the outer protective covering 9. The clamping rings or clamping ring segments 27 can be formed from a metallic material such as steel. In particular, it can be provided for that several clamping ring segments 27 are arranged so as to be distributed across the circumference.

Moreover, washers or circlips 25 can also be arranged between the outer clamping nut 26 and the clamping rings or clamping ring segments 27.

In a further embodiment variant which is not depicted, it can also be provided for that clamping rings or clamping ring segments 27 are also arranged between the inner clamping nut 21 and the outer protective covering 9.

As can be seen from FIGS. 3 and 4, it can also be provided for that the outer protective covering 9 has a constant wall thickness 28. In this respect, the wall thickness 28 is measured such that outer protective covering 9 can be produced with amount of material required can be kept as low as possible and, despite this, the wall thickness 28 is sufficiently large for the outer protective covering 9 to absorb corresponding impact loads.

As can be seen from FIG. 4, it can be provided for that the outer protective covering 9 is formed from individual protective covering segments 29, which are welded together to form the outer protective covering 9.

The individual protective covering segments 29 can for example be produced by means of injection molding or by means of deep drawing. In particular, it can be provided for that the individual protective covering segments 29 are selected such as regards their dimensions that they can be produced in a common injection molding machine or deep drawing machine.

As can be seen from FIGS. 3 and 4, it can also be provided for that the outer protective covering 9 is formed toroidally, wherein the side of the torus facing the center is open and serves for holding the flange region 6.

Furthermore, fastening lugs 30 can be attached to the torus, these being penetrated by through-bores 31 and serving for clamping by means of the threaded rod 20.

A radius 31 of the circle segment forming the cross-section of the torus is preferably selected so large that the outer protective covering 9 is at a sufficient distance from the flange region 6, in particular from the lapped flange 18 and from the stub end 17, in order to be able to protect these from damage even if the outer protective covering 9 is deformed by force.

As can further be seen from FIGS. 3 and 4, it can additionally be provided for that an internal protective body 33 is formed, which is arranged on the outside of the stub end 17 as seen radially. The internal protective body 33 can be formed by a hose, which is also placed toroidally around the stub end 17. It can in particular be a rubber hose with a larger wall thickness.

The internal protective body 33 can be additionally filled with compressed air or another medium to achieve an additional damping effect for the outer protective covering 9. The internal protective body 33 serves in particular to form a further damping unit in the event of excessive deformation of the outer protective covering 9 in order to prevent the outer protective covering 9 from coming into contact with the lapped flange 18 or with the stub end 17. So as to allow for the greatest possible amount of energy to be absorbed at the outer protective covering 9, it is provided for that the outer protective covering 9 is arranged at a distance 34 from the internal protective body 33.

To be able to center the closing cover 10 during mounting on the plastic pipe 3, a centering ring 35 arranged on the inner end face 22 of the closing cover 10 can be provided.

Figure 5:
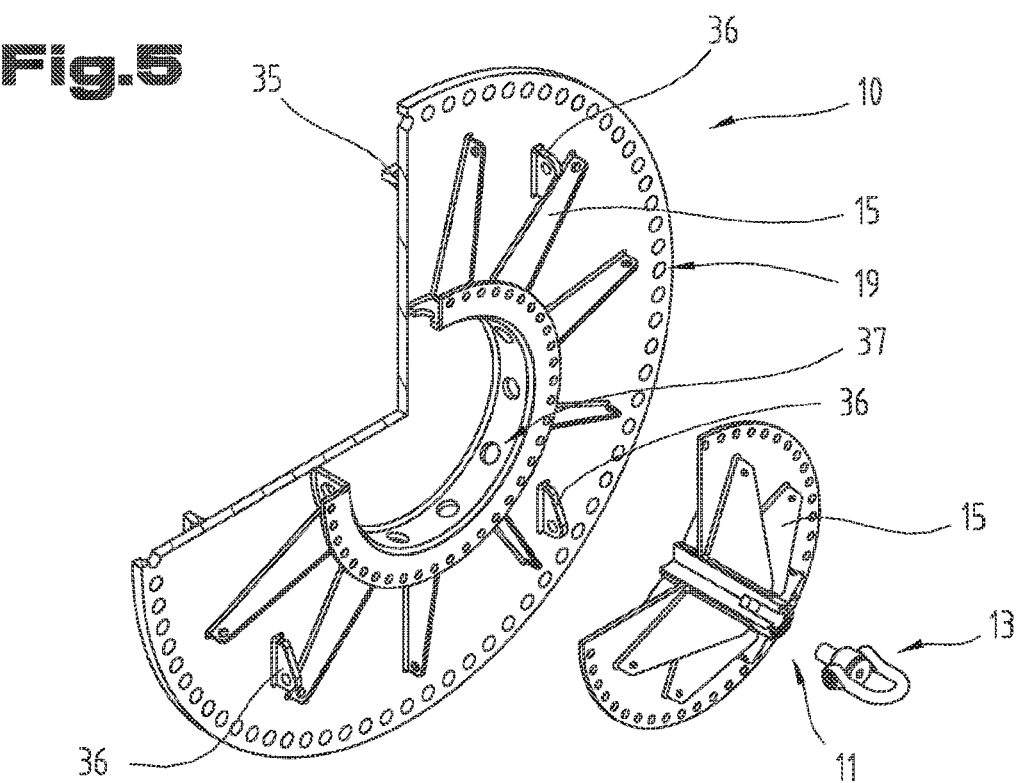
FIG. 5 a sectional view in isometric view of a closing cover.

FIG. 5 shows a perspective sectional view of an exemplary embodiment of the closing cover 10. As can be seen from FIG. 5, it can be provided for that lifting lugs 36, which serve for manipulating and positioning the closing cover 10, are arranged on the closing cover 10. It can further be provided for that the pulling device 11 is coupled to the closing cover 10 by means of a flange connection. In this regard, the pulling device 11 can also have stiffening ribs 15. It can further be provided for that outlet bores 37, which serve for dewatering of the closing cover 10 are arranged in the flange region between the pulling device 11 and the closing cover 10.

From FIG. 5, the pivot bearing 14 for rotatably holding the pulling shackle 13 can well be seen, too.

FIGS. 3 and 4 serve for description of the method for producing a plastic pipe 3 and/or the pipe combination 1.

Preferably, it can be provided for that the plastic pipe 3 is extruded from the extrusion machine into water located in the vicinity of the extrusion machine. In order to keep the plastic pipe 3 floatable, the front end face of the plastic pipe 3 in the extrusion process is closed with a sealing balloon, which allows for the plastic pipe 3 to be continuously led into the water.

Once the maximum extrusion length, for example 600 meters, is reached, the extrusion process is stopped. Subsequently, the last extruded region of the plastic pipe 3 is cut off and a lapped flange 18 is pushed onto the plastic pipe 3 in this region. Subsequently, a stub end 17 is welded to the cut-off end of the plastic pipe 3. Hence, the front flange region 6 is formed. Then, the front closing cover 10 can be placed on the end face 23 of the stub end 17 while inserting the seal 24 and screwed to the lapped flange 18 by means of threaded rods 20 and inner clamping nuts 21.

In a further method step, the individual protective covering segments 29 can be screwed to the threaded rod 20 by means of the outer clamping nuts 26 and thus form the base shape of the outer protective covering 9. Subsequently, the individual protective covering segments 29 can be welded together to be connected to form a stable protective covering 9.

In an alternative embodiment variant, it can be provided for that the individual protective covering segments 29 are at least partly already welded together prior to mounting to the threaded rods 20 and are subsequently attached to the threaded rods 20 in larger partial segments. Subsequently, the remaining open brackets can be welded together between the individual protective covering segments 29.

In yet another exemplary embodiment, it is also conceivable that the outer protective covering 9 is produced from one piece or is completely prefabricated before mounting on the plastic pipe 3.

In yet another embodiment variant, it can also be provided for that the internal protective body 33 is arranged around the flange region 6 prior to mounting of the outer protective covering 9.

Figure 6:
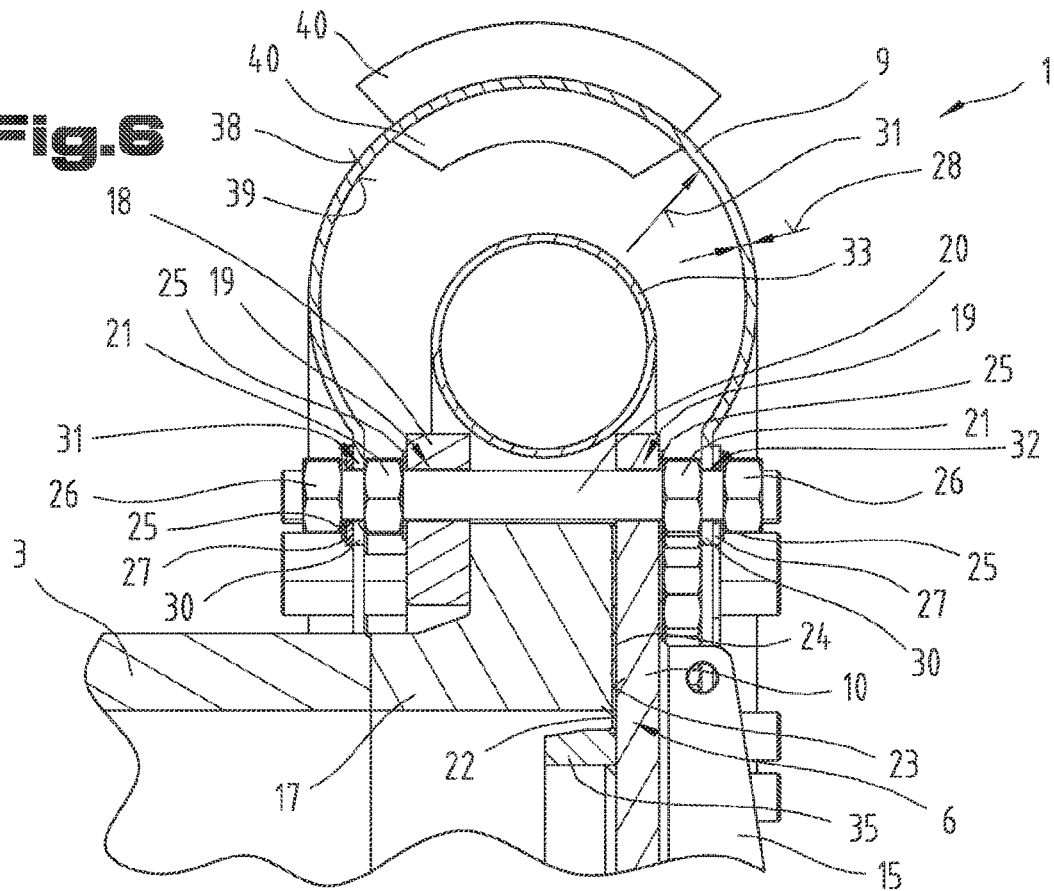
FIG. 6 a sectional top view of a second exemplary embodiment of the flange connection with flange protection.

FIG. 6 shows a further and possibly independent embodiment of the pipe combination 1, wherein again, equal reference numbers and/or component designations are used for equal parts as in FIGS. 1 through 5 above. In order to avoid unnecessary repetitions, it is pointed to/reference is made to the detailed description in FIGS. 1 through 5 preceding it.

As can be seen from FIG. 6, it can be provided for that stiffening ribs 40 are arranged on the radial outside 38 of the outer protective covering 9 and/or on the radial inside 39 of the outer protective covering 9, which additionally serve to absorb absorption energy. Several stiffening ribs 40 can be arranged so as to be evenly distributed across the circumference.

FIG. 7 shows a further and possibly independent embodiment of the pipe combination 1, wherein again, equal reference numbers and/or component designations are used for equal parts as in FIGS. 1 through 5 above. In order to avoid unnecessary repetitions, it is pointed to/reference is made to the detailed description in FIGS. 1 through 5 preceding it.

As can be seen from FIG. 7, it can be provided for that the outer protective covering 9 comprises a first covering part 41 and a second covering part 42, which together form the shape of the outer protective covering 9. Such covering parts have the advantage that they can be designed to save material and/or can be easily mounted on the plastic pipe 3. In addition to this, it can be provided for that the individual covering parts 41, 42 are coupled to one another by means of a connecting rib 43. Several ones of these connecting ribs 43 can be arranged so as to be evenly distributed across the circumference.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS

| | |
|---|---|
| 1 | pipe combination |
| 2 | front longitudinal end |
| 3 | plastic pipe |
| 4 | rear longitudinal end |
| 5 | outer diameter plastic pipe |
| 6 | front flange region |
| 7 | rear flange region |
| 8 | flange protection |
| 9 | outer protective covering |
| 10 | front closing cover with pulling device |
| 11 | pulling device |
| 12 | rear closing cover |
| 13 | pulling shackle |
| 14 | pivot bearing |
| 15 | stiffening rib closing cover |
| 16 | access openings |
| 17 | welding neck |
| 18 | lapped flange |
| 19 | through-bore |
| 20 | threaded rod |
| 21 | inner clamping nut |
| 22 | inner end face closing cover |
| 23 | end face welding neck |
| 24 | seal |
| 25 | washer or circlip |
| 26 | outer clamping nut |
| 27 | clamping ring or clamping ring segment |
| 28 | wall thickness outer protective covering |
| 29 | protective covering segments |
| 30 | fastening lug |
| 31 | radius |
| 32 | through-bore fastening lug |
| 33 | internal protective body |
| 34 | distance |
| 35 | centering ring |
| 36 | lifting lug |
| 37 | outlet bore |
| 38 | radial outside outer protective covering |
| 39 | radial inside outer protective covering |
| 40 | stiffening rib |
| 41 | first covering part |
| 42 | second covering part |
| 43 | connecting rib |

The invention claimed is:

1. A floatable pipe combination comprising:
   a plastic pipe having a rear longitudinal end, on which a rear flange region is formed, and a front longitudinal end, on which a front flange region is formed;
   a rear closing cover arranged on the rear longitudinal end;
   a front closing cover arranged on the front longitudinal end, wherein a pulling device is arranged on the front closing cover,
      wherein at least on the front longitudinal end, a flange protection (8) with an outer protective covering is arranged,
      wherein the outer protective covering is formed to radially project with respect to the outer diameter of the plastic pipe, and
      wherein the flange protection comprises an internal protective body which encloses the circumference of the rear flange region.

2. The floatable pipe combination according to claim 1, wherein at least one of the front flange region and the rear flange region comprises a lapped flange, which is supported on a, stub end and
   wherein the outer protective covering of the flange protection is screwed together with the lapped flange.

3. The floatable pipe combination according to claim 2, wherein the outer protective covering is formed in its base shape as a rotational body, which is open on its side facing the center of rotation and accommodates at least one of the front flange region and the second flange region.

4. The floatable pipe combination according to claim 3, wherein the outer protective covering spans the front closing cover, the stub end and the lapped flange in a semicircle.

5. The floatable pipe combination according to claim 4, wherein the outer protective covering is coupled to at least one of the first flange region and the second flange region by a threaded rod,
   wherein in the lapped flange and in the front closing cover through-bores are formed which are penetrated by the threaded rod,
   wherein on the threaded rod inner clamping nuts are arranged,
   wherein the front closing cover and the lapped flange are clamped to each other by the inner clamping nuts, and
   wherein the outer protective covering is clamped between outer clamping nuts and the inner clamping nuts.

6. The floatable pipe combination according to claim 5, wherein clamping rings or clamping ring segments are arranged between the outer clamping nuts and the outer protective covering.

7. The floatable pipe combination according to claim 3, wherein the outer protective covering comprises a first covering part and a second covering part (42), and
   wherein the first covering part is arranged in the region of the lapped flange and the second covering part is arranged in the region of the front closing cover.

8. The floatable pipe combination according to claim 1, wherein the outer protective covering is formed from a plastic material.

9. The floatable pipe combination according to claim 8, wherein the outer protective covering is formed from polyethylene.

10. The floatable pipe combination according to claim 1, wherein the outer protective covering comprises individual protective covering segments, which are welded together to form the outer protective covering.

11. The floatable pipe combination according to claim 1, wherein a centering ring is arranged on an inner end face of the front closing cover arranged on the front longitudinal end.

12. The floatable pipe combination according to claim 1,
wherein a pulling shackle is coupled to the front closing cover arranged at the front longitudinal end, and
wherein a pivot bearing is formed between the pulling shackle and the front closing cover such that the pulling shackle is arranged on the front closing cover so as to be rotatable relative to the front closing cover.

13. The floatable pipe combination according to claim 1, wherein the outer protective covering has a radially outer side and a radially inner side, and
wherein stiffening ribs are arranged on the outer protective covering on at least one of the radially outer side and the radially inner side.

14. The floatable pipe combination according to claim 1, wherein the outer protective covering has a wall thickness of between 5 mm and 25 mm.

15. A method for producing the floatable pipe combination according to claim 1, comprising the following method steps:
providing a plastic pipe having a rear longitudinal end, on which a rear flange region is formed, and a front longitudinal end, on which a front flange region is formed;
mounting a rear closing cover to the rear longitudinal end of the plastic pipe;
mounting a front closing cover to the front longitudinal end of the plastic pipe;
mounting an outer protective covering of a flange protection to the front longitudinal end of the plastic pipe,
wherein the outer protective covering is formed to radially project with respect to the outer diameter of the plastic pipe, and
wherein the flange protection comprises an internal protective body which encloses the circumference of the rear flange region.

16. The method according to claim 15,
wherein the front closing cover is mounted to the front longitudinal end of the plastic pipe by threaded rods and inner clamping nuts,
wherein subsequently in the course of the method individual protective covering segments are mounted to the threaded rods by outer clamping nuts, and
wherein the individual protective covering segments are welded together to form the outer protective covering.

17. A floatable pipe combination comprising:
a plastic pipe having a rear longitudinal end, on which a rear flange region is formed, and a front longitudinal end, on which a front flange region is formed;
a rear closing cover arranged on the rear longitudinal end;
a front closing cover arranged on the front longitudinal end, wherein a pulling device is arranged on the front closing cover,
wherein at least on the front longitudinal end, a flange protection with an outer protective covering is arranged,
wherein the outer protective covering is formed to radially project with respect to the outer diameter of the plastic pipe,
wherein the front flange region comprises a lapped flange, which is supported on a stub end,
wherein the front closing cover is screwed together with the lapped flange, and
wherein the outer protective covering of the flange protection is screwed together with the lapped flange.

* * * * *